US006686902B2

(12) United States Patent
Lee

(10) Patent No.: US 6,686,902 B2
(45) Date of Patent: Feb. 3, 2004

(54) METHOD AND APPARATUS FOR INPUTTING CHARACTERS IN A MOBILE TERMINAL

(75) Inventor: Sang-Yoon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 198 days.

(21) Appl. No.: 09/804,566

(22) Filed: Mar. 12, 2001

(65) Prior Publication Data

US 2002/0041261 A1 Apr. 11, 2002

(30) Foreign Application Priority Data

Sep. 27, 2000 (KR) ........................ 2000-56726

(51) Int. Cl.[7] ................................ G09G 5/08
(52) U.S. Cl. ...................... 345/157; 345/169
(58) Field of Search .................. 345/157, 158, 345/159, 160, 161, 162, 163, 168, 169, 170, 810, 16; 341/22; 455/412; 710/67; 708/146

(56) References Cited

U.S. PATENT DOCUMENTS

| 5,258,748 A |   | 11/1993 | Jones ........................ 345/172 |
| 5,287,526 A | * | 2/1994  | Wolf et al. ................. 708/146 |
| 5,714,983 A | * | 2/1998  | Sacks ........................ 345/168 |
| 5,987,317 A | * | 11/1999 | Venturini ................... 455/412 |
| 5,991,396 A |   | 11/1999 | Salm et al. ................. 379/355 |
| 6,157,323 A | * | 12/2000 | Tso et al. ................... 341/22 |
| 6,204,848 B1 | * | 3/2001 | Nowlan et al. ............. 345/810 |
| 6,286,064 B1 | * | 9/2001 | King et al. ................. 710/67 |
| 6,310,609 B1 | * | 10/2001 | Morgenthaler .............. 345/170 |
| 6,346,894 B1 | * | 2/2002  | Connolly et al. ........... 341/22 |

FOREIGN PATENT DOCUMENTS

| CN | 11 93 877 | 9/1998 |
| CN | 1193877 A | 9/1998 |
| DE | 33 07 354 A1 | 3/1983 |
| DE | 33 07 354 | 9/1984 |
| EP | 0 373 319 A2 | 10/1989 |
| EP | WO 96/02394 | 2/1996 |
| EP | 0 957 425 A1 | 5/1998 |
| EP | WO 99/65212 | 12/1999 |

OTHER PUBLICATIONS

English language translation of the Abstract of DE 33 07 354 (one page).
English language translation of the Abstract of CN 1193877 (one page).
European Search Reported dated Aug. 12, 2002 issued in counterpart application, EP Appln. No. 01119850.4.

* cited by examiner

*Primary Examiner*—Amare Mengistu
*Assistant Examiner*—Prabodh M. Dharia
(74) *Attorney, Agent, or Firm*—Dilworth & Barrese, LLP

(57) ABSTRACT

A method and apparatus for minimizing the number of key pressings required for character input. When a key is initially pressed, a controller searches, in a storage unit, for characters corresponding to the keys pressed, and sequentially displays the characters in a current cursor position according to a predetermined time that the key is pressed. When pressing of the key is terminated, the character presently displayed in the current cursor position is maintained and the cursor moves to the next cursor position. Since the wanted character can be inputted by pressing only one key, there is a minimal amount of keys utilized to input a character. In particular, by utilizing a consecutive input, the same character can be inputted more effectively and conveniently.

9 Claims, 3 Drawing Sheets

METHOD AND APPARATUS FOR INPUTTING CHARACTERS IN A MOBILE TERMINAL

PRIORITY

This application claims priority to an application entitled "METHOD AND APPARATUS FOR INPUTTING CHARACTERS IN A MOBILE TERMINAL" filed with the Korean Industrial Property Office on Sep. 27, 2000 and assigned Serial No. 2000-56726, the contents of which is hereby incorporated by reference.

BACKGROUND OF THE INVENTION

1. Field of the Invention

The present invention relates to a mobile terminal, and more particularly, to a method and apparatus for minimizing the number of keys pressed by a user when a key input unit is utilized to input characters.

2. Description of the Related Art

In general, mobile terminals are becoming more compact and lightweight, enabling it to be easily carried. As the size of the terminal becomes smaller, the area of a key input unit associated with the terminal also becomes smaller. Accordingly, most terminals have only basic function keys and a minimum amount of number keys.

Meanwhile, as the number of finctions included in the terminals increase, the number of keys associated with the number of functions needed also tends to increase. In order to solve such a problem, different operations are carried out according to the number of keys pressed so that one key can be utilized to input a number of characters. Therefore, in the case where a keypad in the mobile terminal is used to input a character, a user is required to repeatedly press the same key 1 to 5 times according to the order printed on the keypad. If the user repeatedly presses the same key in succession, the cursor can be displaced to the next character position only after a delay of a predetermined time or an artificial key operation.

In the mobile terminal of the related art as described hereinabove, a number of characters are allocated to one number key and the characters are inputted according to the number of times the key is pressed so that one key must be pressed repeatedly or a number of keys are pressed in order that the wanted character may be displayed. There is a problem that exists where the user waits for a certain time to displace the cursor, artificially, when the same key is repeatedly pressed. Therefore, there exists a need in the art for a device or method where a user is not required to wait a certain amount of time to artificially displace the cursor when the same key is repeatedly pressed.

SUMMARY OF THE INVENTION

It is therefore an object of the present invention to provide a method for allowing a user of a mobile terminal to easily input characters.

It is another object of the invention to provide a method, which can minimize the number of keys pressed when the characters are inputted into the mobile terminal.

According to a preferred embodiment of the invention, there is provided a method for inputting characters in a mobile terminal which includes a key input unit and a storage unit for storing a number of characters in mutual association which are arranged in predetermined order, the method comprising: confirming if a key input signal is generated from the key input unit; if the key input signal is generated, searching a number of characters corresponding to the inputted key from the storage unit and displaying the characters in a current cursor position in sequence according to a predetermined time interval; when generation of the key input signal is terminated, maintaining the characters displayed at the point of time when the key input signal is terminated; and displacing the current cursor position to the next cursor position after maintaining the displayed characters.

According to another preferred embodiment of the invention, there is provided a method for inputting characters in a mobile terminal, comprising: sequentially displaying characters corresponding to pressing a key from a number of keys in a key input unit; and when the pressing of the key is terminated, maintaining a character displayed in a current cursor position and displacing the current cursor position to a next cursor position.

According to another preferred embodiment of the invention, there is provided a method for inputting characters in a mobile terminal, the method comprising: storing a number of characters in mutual association with respect to each of a number of keys in a key input unit; and when one of the keys is pressed, displaying one character corresponding with a maintained time of the key pressed from the characters stored in association with the pressed key of the key input unit.

According to a further preferred embodiment of the invention, there is provided an apparatus for inputting characters in a mobile terminal, comprising: a key input unit having a number of keys; a storage unit for a number of characters in mutual association which are arranged in predetermined order with respect to each of the keys; a display unit for displaying a character associated with the key inputted by the key input unit; a controller, for searching corresponding characters from the storage unit and sequentially displaying the searched characters in a current cursor position of the display unit according to a time interval when a key is pressed, and maintaining the characters displayed in the display unit and displacing the current cursor position to the next cursor position when pressing of the key being pressed is terminated.

BRIEF DESCRIPTION OF THE DRAWINGS

Hereinafter a preferred embodiment of the present invention will be described in reference to the appended drawings, wherein.

DETAILED DESCRIPTION OF THE PREFERRED EMBODIMENTS

Detailed specific matters are presented in the following description. However, it should be understood that these are provided only for helping the general understanding of the present invention and it will be apparent to those skilled in the art that the invention can be performed even without these specific matters. Also, in describing the invention, detailed description about related known functions or structures will be omitted if the detailed description thereof may unnecessarily obscure the substance of the invention.

Figure 1:
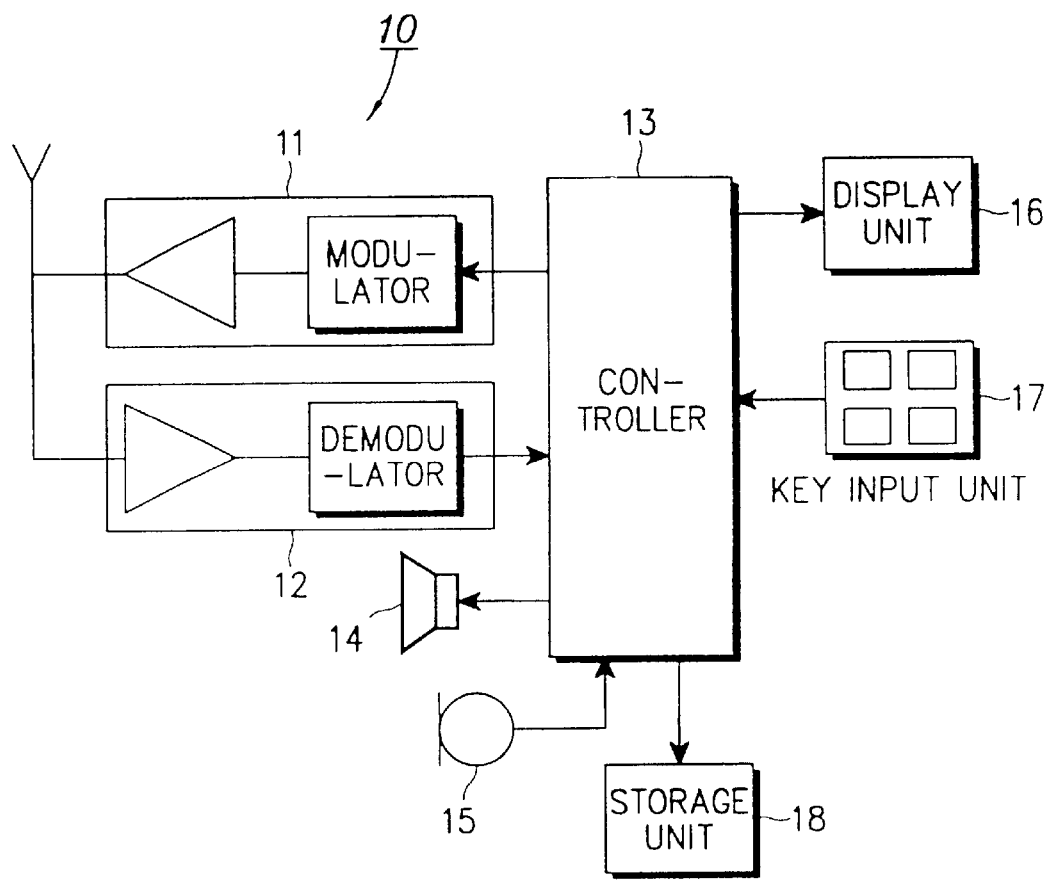
FIG. 1 shows the internal structure of a mobile terminal according to an embodiment of the invention.

FIG. 1 shows the internal structure of a mobile terminal according to an embodiment of the invention.

Referring to FIG. 1, a mobile terminal 10 acts as a transceiver in a mobile telephone system which includes a base station, a mobile switching center and a message center. Mobile terminal 10 is comprised of a transmitter 11, a receiver 12, a controller 13, a speaker 14, a microphone 15, a display unit 16, a key input unit and a storage unit 18. Those of ordinary skill in the art will recognize that a mobile terminal may be comprised of more elements than those described by this invention. Transmitter 11 includes a modulator and a transmitting amplifier. Receiver 12 includes a receiving amplifier and a demodulator.

Display unit 16 can be constructed as an LCD(Liquid Crystal Display) for example and outputs various display data generated in mobile terminal 10. Key input unit 17 can be constructed as a keypad for example and comprises a plurality of number keys, function keys for interface with a user, and keys for conversation. If the user presses one of the keys, the key input unit 17 generates a key input signal corresponding thereto.

Storage unit 18 is comprised of a ROM(Read Only Memory) for storing a number of programs and data, a RAM(Random Access Memory), an audio memory, etc. Storage unit 18 also stores a number of characters in mutual association, which are arranged in a predetermined order with respect to each of the keys of the key input unit 17 according to the embodiment of the invention.

Controller 13 includes a DSP(Digital Signal Processor), a microprocessor and other circuits, and controls the transmitter 11 and the receiver 12, so that the mobile telephone user can perform a conversation with another user by using a speaker 14 and a microphone 15. In particular, the controller 13 controls the display unit 16 and the key input unit 17 to perform a character input operation according to the embodiment of the invention.

Figure 2:
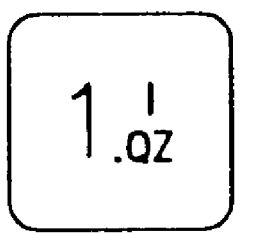
FIG. 2 shows the structure of a key input unit according to the embodiment of the invention.
Figure 2:
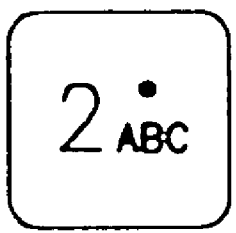
Figure 2:
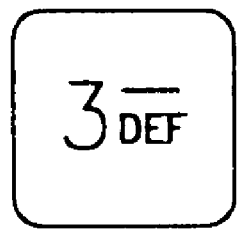
Figure 2:
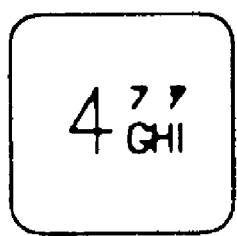
Figure 2:
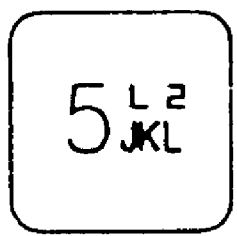
Figure 2:
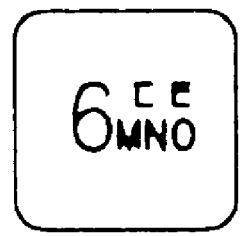
Figure 2:
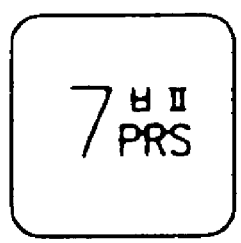
Figure 2:
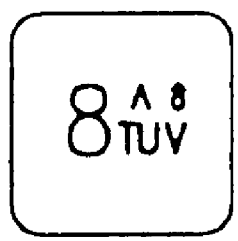
Figure 2:
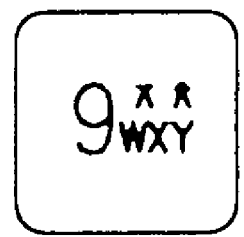
Figure 2:
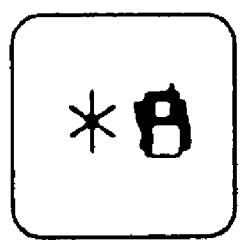
Figure 2:
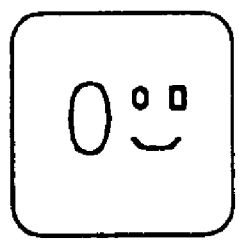
Figure 2:
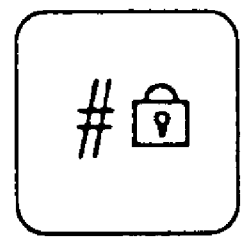

FIG. 2 shows the structure of a key input unit according to the embodiment of the invention.

Referring to FIG. 2, the key input unit 17 has a number of keys, which are mutually associated with a number of characters that are arranged in the predetermined order according to a character input mode. For example, the number key "2" is associated with "A", "B", "C", and "2" in a capital letter input mode, and "a", "b", "c", and "2" in a small letter input mode in sequence.

Figure 3:
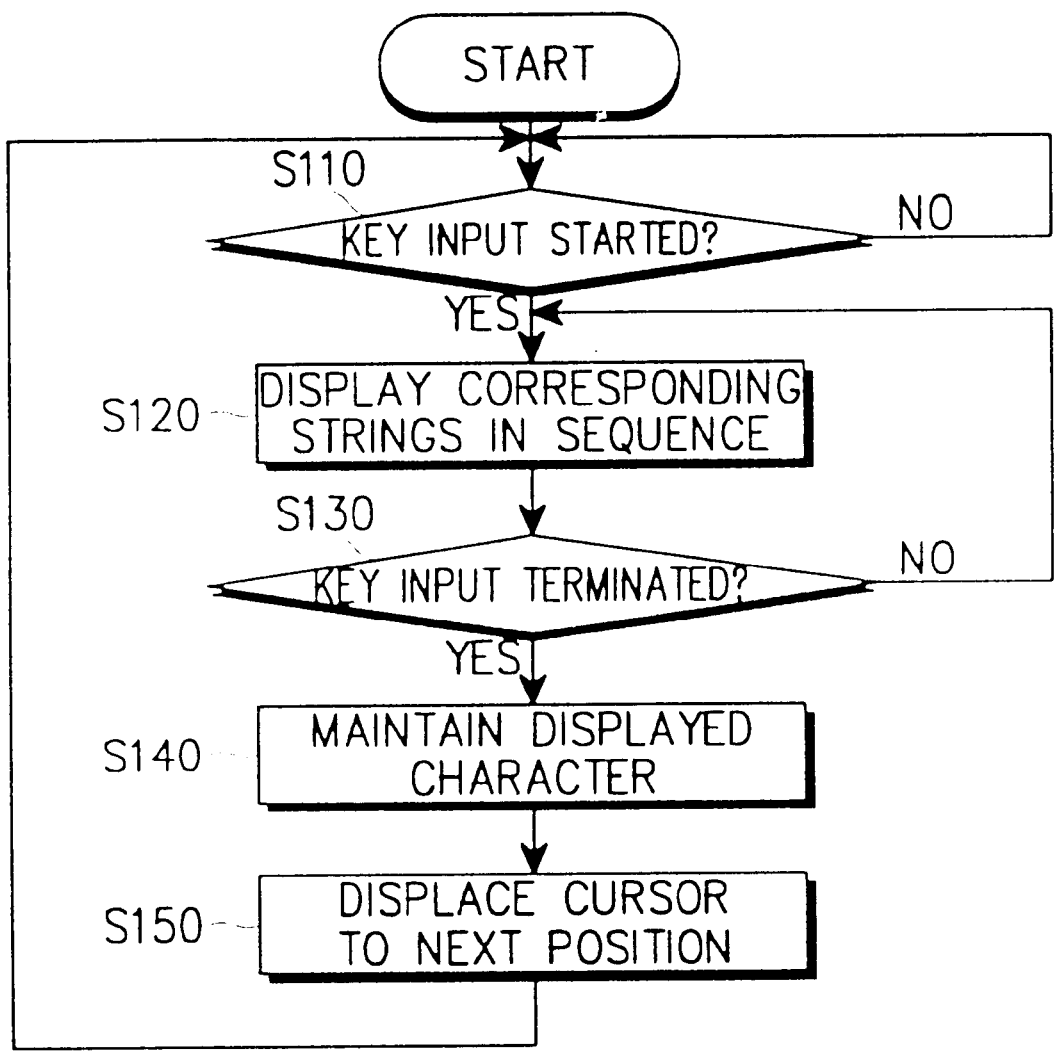
FIG. 3 shows a flow chart for inputting characters according to the embodiment of the invention.

FIG. 3 shows a flow chart for inputting characters according to the embodiment of the invention.

The embodiment of the invention will be described hereinafter with reference to FIG. 1 to FIG. 3 as follows:

In step S110 of FIG. 3, the controller 13 confirms if the user starts to press one of the keys. When the user presses one of the keys in the key input unit 17, the key input unit 17 generates a key input signal. The key input unit 17 consecutively generates the key input signal while the user keeps pressing the key. The key input signal is inputted into the controller 13.

If pressing of a key is started by the user, namely, generation of the key input signal is started, the controller 13 searches for characters corresponding to the inputted key from the storage unit 18 and displays the searched characters in sequence, according to a predetermined time interval in the current cursor position of the display unit 16, in step S120. The display of the characters like this is consecutively repeated while the key input signal is being generated. Also, the characters can be flickered in display unit 16 to show that the input is not completed.

For example, when the "2" key is inputted, "A", "B", "C" and "2" will be repeatedly flickered in sequence in the current cursor position (in the capital letter input mode). Here, the time interval for displaying the characters can be designated while manufacturing the mobile terminal or adjusted by the user, for example in increments of 0.2, 0.3 or 0.4 second. The user removes his/her finger from the key when a wanted character is displayed and terminates the key pressing.

In step S130, the controller 13 confirms if generation of the key input signal is terminated, namely, once pressing the key by the user is terminated. If the pressing of the key is terminated, then controller 13 maintains the character displayed in the display unit at that point of time in step S140. For example, when the time interval for displaying characters is set at 0.2 second and the "2" key is pressed by the user, the character "A" will be displayed, if pressing of the key is terminated between 0.2 and 0.4 seconds, and the character "B" will be displayed if pressing of the key is terminated between 0.4 and 0.6 seconds. If pressing is not terminated, the process returns to step S120.

After the character wanted by the user is inputted along the foregoing steps, the controller 13 displaces the current cursor position to a next cursor position even without any key input and waits for an input of the next character in step S150. The process then returns to step S110.

This embodiment can be briefly described as follows:

When the user waits while pressing the key of the mobile terminal until the wanted character is displayed, and then releases the pressed key, the wanted character is directly inputted. When the wanted character is inputted, the mobile terminal advances into an input standby state of the next character.

This embodiment can be described in comparison with the related art as follows:

When an input, a word or a string of letters "LEE" is wanted in the related art, the user presses the "5" button three times to display "L", and then waits for a while or presses "#▶" button to move to the next position. After that, the user presses the "3" button twice to display the "E" character, and then waits for a while or presses "#▶" button to move to the next position. Then, the user presses the "3" button twice to display the second "E" character.

In the present invention, four characters of "J", "K", "L" and "5" are repeatedly displayed in sequence while the user just keeps pressing the "5" button. When the user takes his/her finger off the "5" button, when the wanted character "L" is displayed, then the display of "L" is maintained. At the same time, the cursor is automatically displaced to the next cursor position. Then, the user presses the "3" button for a while and takes the finger off when "E" is displayed, and then presses the "3" button for a while without waiting so that "E" can be displayed.

According to the present invention, since various characters are displayed according to the maintained time the key is pressed rather than the number of times the key is pressed, the number of key pressings by the user can be minimized, and in particular, the standby time or the number of times the key is pressed can be minimized in inputting the same character consecutively.

According to the embodiment as described hereinabove, the number of times a key is pressed for a wanted character can be minimized because the wanted character can be inputted with only one key being pressed from a key input in the mobile terminal. In particular, the same character can be inputted more effectively and conveniently in a consecutive input.

Also, if the order or arrangement of the characters are changed the characters corresponding to the inputted key are displayed in the display unit in sequence, so that the characters can be easily inputted even if the order or arrangement of the characters is changed.

While the detailed embodiment has been described, above, it should be understood that various modifications or variations can be made without departing from the scope of the invention. For example, while it has been described above for inputting English characters only, the invention can be applied to characters of other languages such as Korean. Therefore, the scope of the invention should be not restricted by the above described embodiment, but should be defined by the following claims or equivalents thereof.

What is claimed is:

1. A method for inputting characters in a mobile terminal having a key input unit for generating key input and a storage unit for storing one or more characters, said characters being in mutual association and arranged in a predetermined order, the method comprising the steps of:

confirming that a key input signal is generated;

retrieving one or more characters corresponding to the inputted key from the storage unit;

continuously displaying the retrieved one or more characters in a current cursor position in sequence until the key input signal is no longer generated, wherein a duration of display of individual one or more characters is according to a predetermined time interval; and maintaining the character displayed at the point of time when generation of the key input signal is terminated.

2. A method for inputting characters in a mobile terminal according to claim 1, further comprising the step of displacing the cursor to the next cursor position after maintaining the displayed character.

3. A method for inputting characters in a mobile terminal according to claim 1, wherein the time interval can be adjusted by a user.

4. A method for inputting characters in a mobile terminal by pressing a key of a key input unit, the method comprising the steps of:

sequentially and repeatedly displaying one or more characters corresponding to the pressed key while the key is pressed;

when pressing of the key is terminated, maintaining the character displayed in a current cursor position and displacing the current cursor position to a next cursor position.

5. An apparatus for inputting characters in a mobile terminal, comprising:

a key input unit having one or more keys;

a storage unit for storing one or more characters, said characters being in mutual association arranged in predetermined order with respect to each of the keys of said key input unit;

a display unit for displaying said one or more characters and a controller for
   retrieving corresponding characters from the storage unit,
   sequentially and repeatedly displaying the corresponding characters in a current cursor position of the display unit while the key is pressed by a user, maintaining the displayed corresponding character in the display unit when the user releases the key, and
   displacing the current cursor position to a next position when the user terminates pressing of the key.

6. A method for inputting characters in a mobile terminal having a key input unit, a display and a memory, the method comprising:

inputting a key from a plurality of keys of the key input unit by pressing the key;

generating a key input signal corresponding to the key pressed;

retrieving from the memory characters corresponding to the pressed key from the plurality of keys;

repeatedly displaying the retrieved character corresponding to the key input in a sequence;

maintaining the character displayed in a current cursor position when pressing of the key is terminated; and displacing the cursor from the current cursor position to a next cursor position upon termination of pressing of the key.

7. The method of claim 6, wherein the searched characters are displayed according to a predetermined time interval in the current position of the display unit.

8. The method of claim 7, wherein the predetermined time interval is greater than or equal to 0.2 seconds and less than or equal to 0.4 seconds.

9. The method of claim 7, wherein the predetermined time interval is less than or equal to 0.4 seconds.

* * * * *